United States Patent [19]
Norcross

[11] Patent Number: 5,421,995
[45] Date of Patent: Jun. 6, 1995

[54] SLUDGE BLANKET LEVEL DETECTOR SUSPENDED FROM FLOATING DECANTER

[75] Inventor: Kenneth L. Norcross, Edwardsville, Kans.

[73] Assignee: JMO Holding, Inc., Edwardsville, Kans.

[21] Appl. No.: 84,911

[22] Filed: Jul. 1, 1993

[51] Int. Cl.6 .............................................. B01D 21/30
[52] U.S. Cl. ........................................ 210/86; 210/94; 210/96.1; 210/242.1
[58] Field of Search .................... 210/86, 93, 94, 90.1, 210/97, 103, 109, 122, 123, 242.1, 513, 614, 620, 629, 744, 745; 73/305–308, 322.5

[56] References Cited

U.S. PATENT DOCUMENTS

| | | | |
|---|---|---|---|
| 1,170,290 | 2/1916 | Lindsay | 73/322 |
| 2,154,132 | 4/1939 | Mallory | 210/614 |
| 3,025,962 | 3/1962 | Williams | 210/86 |
| 3,495,617 | 2/1970 | Zifferer | 73/322 |
| 3,551,670 | 12/1970 | Topol et al. | 250/43.5 |
| 3,644,914 | 2/1972 | Veasaw et al. | 340/236 |
| 3,923,655 | 12/1975 | McKinney | 210/86 |
| 4,348,278 | 9/1982 | Caccia | 210/86 |
| 4,446,016 | 5/1984 | Stubbs | 210/86 |
| 4,876,888 | 10/1989 | Ricketts et al. | 210/744 |
| 4,911,831 | 3/1990 | Davison et al. | 210/86 |
| 4,967,593 | 11/1990 | McQueen | 73/295 |
| 4,976,871 | 12/1990 | Banks et al. | 210/709 |
| 5,015,393 | 5/1991 | Russell | 210/744 |
| 5,021,161 | 6/1991 | Calltharp | 210/744 |
| 5,036,882 | 8/1991 | Norcross et al. | 137/543.23 |
| 5,078,861 | 1/1992 | Krofta | 210/744 |
| 5,080,803 | 1/1992 | Bagatto et al. | 210/744 |
| 5,105,663 | 4/1992 | Kuhlen | 73/308 |
| 5,106,494 | 4/1992 | Norcross | 210/123 |
| 5,186,821 | 2/1993 | Murphy | 210/86 |

Primary Examiner—Joseph W. Drodge
Attorney, Agent, or Firm—Litman, McMahon & Brown

[57] ABSTRACT

A sludge blanket-clarified liquid interface detector apparatus for a wastewater treatment process including a floating decanter assembly preferably includes a sludge detector light source and light sensor pair positioned in spaced apart relation on a sludge layer detector frame which is suspended in depending relation below the floating decanter assembly. The light sensor is interfaced to a process controller to which is also interfaced a decanter valve which flow controls the decant cycle of the process. As the decant cycle proceeds, the decanter assembly descends along with the falling level of liquid in the process reactor until the detector descends past the interface and into the sludge layer. The decrease in light transmission between the light source and sensor is signaled to the controller which causes the decanter valve to close to end the decant cycle to prevent the discharge of polluting sludge from the reactor.

15 Claims, 1 Drawing Sheet

SLUDGE BLANKET LEVEL DETECTOR SUSPENDED FROM FLOATING DECANTER

BACKGROUND OF THE INVENTION

The present invention relates to a sensing device for determining where a sludge layer begins in a settled waste water treatment vessel, so that clarified waste water above the sludge can be removed from the vessel without entrainment of the sludge.

Sequencing Batch Reactors (SBR's) are utilized to treat wastewater, leachates, and other liquid streams from municipal, private, industrial, and combined sources. The design and ultimate cost of SBR's is determined by examining the expected average and maximum waste water flow rates as well as the organic and chemical pollutant content of the wastewater. Typically, one of these factors will determine the minimum size or capacity of the plant and associated equipment. This, in turn, determines the cost of the system and the operational limits as well.

Frequently, the hydraulic load to the plant is highly variable and becomes a limiting factor. This is especially true when plants are designed to handle high storm flows, or when a multiple unit plant is designed properly to continue to operate effectively when one or more of the units are out of service, so that the remaining units must be capable of handling the full flow.

In a sequencing batch reactor process, it is required that clarified fluid be withdrawn after a settling stop from the reactor or digester within which the process is occurring. During certain cycles within the reactor, especially mix cycles, sludge is agitated with all of the fluid in the reactor in order to mix organic and chemical degrading bacteria with materials in the water being treated. It is important that the decanting system not allow the sludge to enter the decanter during the mix cycles and that the sludge not settle within the decanting system to prevent sludge from being withdrawn along with the clarified liquid when the sludge has settled and clarified liquid is withdrawn from the reactor. Sludge entrained with and discharged with the clarified liquid causes substantial downstream pollution and is very undesirable.

One of the major problems with certain prior art decanter systems for use in batch reactors has been that a receiver for the decanter has had the interior thereof open to fluid within the reactor during sludge mixing cycles. When the sludge is being mixed with the incoming effluent and the entire reactor is in a generally mixed state, sludge occurs near the top of the reactor as well as at the bottom. If the receiver is open at this time, the sludge usually enters the receiver and settles therein during a settling cycle. Thereafter, when the clarified fluid is withdrawn through the receiver, the sludge that settled within the receiver is entrained with the clarified fluid to pollute the effluent.

Over the years, engineers have developed various devices to solve this problem. In one such device, an initial quantity of clarified effluent removed from the reactor during each decanting cycle is pumped back into the reactor to thereby return the entrained sludge. However, such a solution requires a pump and control mechanisms which complicate the system and can easily fail, leading to substantial downstream pollution.

Other attempts to solve the problem of sludge settling within the receiver have been directed to physically removing the receiver from the tank during mixing cycles. This typically requires a cumbersome and expensive structure which is suitably strong to hold a decanting system out of the reactor during the mix cycle. In addition, where freezing is likely to occur, fluid from the decanting structure may freeze if raised from the body of liquid in the reactor, or the fluid level at the top of the reactor may freeze which can make it difficult or impossible to raise and lower the decanting structure.

Various types of pressure responsive valves or flaps have been placed in the openings to the decanting system to keep sludge out of the system when the contents of the reactor are being mixed. While such valves or flaps have had varying degrees of success in reducing the sludge that settles in or on the intake of the decanter, such valves and flaps cannot protect against the decanter being lowered into the settled sludge layer itself.

To overcome the problem of lowering the decanter into the sludge layer, some processes simply cease decanting upon reaching a specific pre selected water lever which is determined by a float switch, or by a level sensing device, which is monitored by a computer or microprocessor. In most cases, this type of operation is grossly inefficient. The float switch or level indicator does not provide an indication of the height of the settled sludge blanket within the vessel. The height of the settled sludge blanket does vary with different conditions, especially with respect to how recently sludge was wasted from the vessel. Therefore, if the sludge biomass has not settled below the height where the discharge enters the decanter, highly polluting sludge is discharged to the environment directly. On the other hand, the discharge of clarified supernatant may be stopped at such a selected water level, when in fact a large quantity of dischargeable supernatant may be available below that level.

A reliable system to monitor the sludge level and operate in such a manner that a high percentage of the dischargeable liquid is decanted with every cycle would maximize the treatment capacity of the process, reduce the initial construction cost and size, as well as avoid the inadvertent discharge of sludge.

SUMMARY OF THE INVENTION

The present invention provides an apparatus for detecting the top of the settling layer of settled sludge in a wastewater treatment process and closing a decanter valve in a clarified water decanter when the decanter gets to within a preselected distance above the sludge layer. As used herein the terms sludge layer or sludge blanket refer to the region of concentrated sludge that settles to the bottom of a waste water treatment reactor after agitation is stopped in the reactor.

In particular, a photoelectric sludge layer detector is suspended below a floating decanter inlet structure by suspension means such as a cable. Preferably the detector includes a light source and a light sensor positioned in spaced apart relation to allow the liquid in the process basin to flow therebetween. Because the sludge is opaque, it blocks the transmission of light from the light source to the light sensor in proportion to the density of the sludge suspended in the water. The detector light source and sensor are mounted on a detector frame and suspended from the floating decanter, preferably by a flexible cable which allows the detector assembly to be lifted periodically for cleaning.

Decanting of the clarified effluent is controlled by a decanter valve which, in turn, is controlled by a process controller or computer which also controls the fill, mix, and settling cycles of the wastewater treatment process. In general, the settling cycle in a sequencing batch reactor is a timed period occurring at the end of the mix cycle in which the decanter valve is held closed. At or near the end of the settling cycle, the decant cycle is initiated by opening the decanter valve, and the clarified effluent flows out of the reactor through the decanter entry structure or receiver into the decanter conduit.

The sludge generally settles out during the settling cycle into a defined layer or blanket fills a lower level within the reactor. The decanter receiver is buoyantly supported by a float and, thus, descends as the fluid level in the reactor drops. When the light passing from the detector light source to the detector light sensor is blocked by sludge because the sensor apparatus has descended into the sludge layer, the controller causes the decanter valve to close to end the decant cycle. The light sensor may be connected to the controller by threshold sensing circuitry so that a selected level of light blockage is required to cause the decanter valve closure to be triggered. Normally, the decanter is spaced a fixed distance, such as eighteen inches above the sensor to provide a margin of safety against the sludge being drawn into the decanter.

The sludge layer detector preferably functions in cooperation with a downstream turbidity sensor which detects sludge within outflowing effluent in the decanter conduit. Normally, the interface between the sludge blanket and the clarified effluent is a relatively smooth horizontal plane. However, the sludge blanket can be locally disturbed in a manner which would not be immediately detected by a single sludge layer detector. Since the decanter receiver is horizontally elongate, it is possible that sludge away from the sludge layer sensor could enter a part of the decanter receiver and be decanted which is the reason for the gap between the sludge layer sensor and the decanter as well as the reason for the downstream sensor.

The downstream turbidity sensor is similar in construction and operation to the sludge layer detector and includes a light source and a light sensor positioned in spaced apart relation within the decanter conduit. The light sensor is coupled to the process controller, as through a threshold sensor. Upon the detected light level from the turbidity light source decreasing to a selected level during the decanting cycle, the controller closes the decanter valve to cease decanting. The controller may be programmed to wait an additional settling period before resuming the decanting cycle after a shutdown caused by the detection of sludge in the decanter conduit.

A decanter receiver may be provided with a plurality of sludge blanket layer detectors spaced therealong and coupled to the process controller whereby the decanter valve is closed if any one of the detectors detects the sludge layer or a disturbed portion thereof. The outputs of multiple sludge layer detectors can be combined by logic circuitry, such as a logic OR circuit, a majority logic circuit, or the like.

The sludge interface detector mounted on the floating decanter structure may be used in cooperation with one or more fixed sludge interface detectors mounted at a fixed depth within the process reactor vessel. Such a fixed detector may include a light source and light sensor which is interfaced to the process controller through a threshold detector. In contrast to the floating detector which causes a logic state change when light transmission is diminished by immersion in the sludge layer, the fixed detector causes a logic stage change when light transmission increases to a selected degree, or maximizes, by the sludge interface descending below the fixed detector. The logic state change caused by the fixed detector detecting the clarified layer may be used to initiate the decant cycle, which is then terminated when the floating detector detects the sludge interface.

In addition to the sludge blanket interface detector based on photoelectric principles, the present invention also contemplates the use of ultrasonic ranging techniques to detect the sludge interface. As used in the present invention, an ultrasonic pulse is transmitted from an ultrasonic transducer toward the interface. The difference in densities, and other properties, of the sludge layer and the clarified water causes a portion of the transmitted pulse to be reflected toward the transducer. Because the reflection or echo of the pulse from the floor of the reactor is likely to be much stronger than a reflection from the sludge interface, circuitry associated with such an ultrasonic apparatus can be used to distinguish between the relatively weak interface reflection and the stronger floor reflection. Additionally, the ultrasonic detection circuitry can be adjusted to ignore any reflections occurring after a set window of interest. As with conventional ultrasonic ranging techniques, the time of reception of an echo after the transmission of the pulse is proportional to the distance of the reflecting medium from the transducer. The process controller can be programmed to close the decant valve when the detected distance between the sludge interface and the transducer decreases to a selected distance to thereby avoid introduction of sludge into the decanter assembly.

OBJECTS AND ADVANTAGES OF THE INVENTION

The principal objects of the present invention are: to provide a wastewater treatment process with the capability of maximizing the decanting of clarified effluent without discharging polluting sludge; to provide a sludge blanket layer detector apparatus for detecting a settled layer of sludge in such a process wherein the detector causes the shutdown of the decanting cycle process in response to detection of the top of the sludge blanket layer; to provide such an apparatus including a light source and a light sensor positioned in spaced apart relation on a sludge layer detector frame which is suspended beneath a floating decanter receiver of the process reactor; to provide such an apparatus wherein the light sensor is interfaced to a process controller of the process, the controller being interfaced to a decanter valve within the decanter receiver whereby when the light transmitted from the light source to the light sensor is diminished during the decant cycle by suspended sludge, the decanter valve is closed to prevent the discharge of polluting sludge from the process reactor; to provide such an apparatus in combination with a downstream turbidity sensor to cause closure of the decanter valve in response to detecting suspended sludge in the fluid passing through the decanter conduit; to provide such an apparatus which may include a plurality of sludge blanket layer detectors suspended along an elongated decanter receiver; and to provide such a sludge blanket layer detector apparatus which is economical to manufacture, which is positive and efficient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

Figure 1:
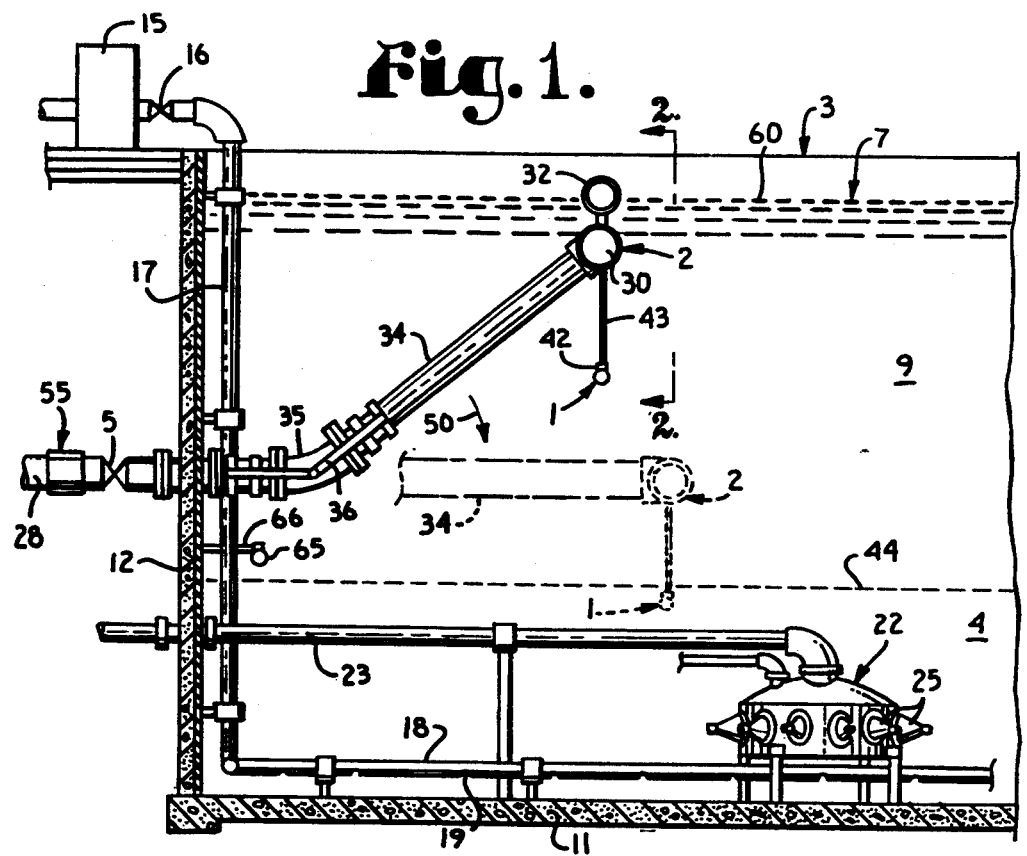
FIG. 1 is a fragmentary transverse sectional view of a wastewater treatment basin having a sludge blanket layer detector apparatus embodying the present invention suspended from a floating decanter structure thereof, with a lowered position of the decanter apparatus shown in phantom lines.
Figure 2:
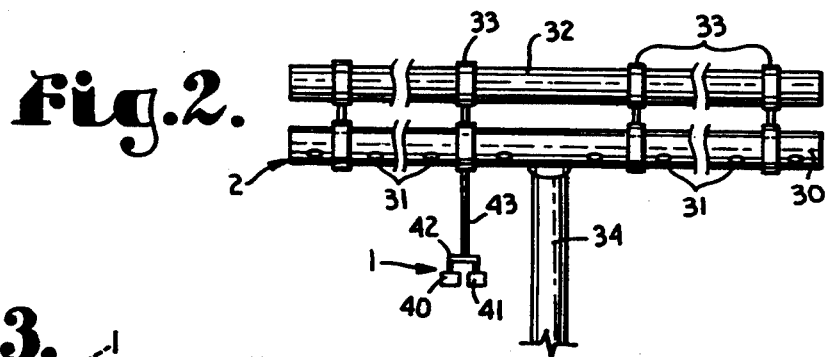
FIG. 2 is an enlarged fragmentary sectional view, taken along line 2—2 of FIG. 1, which illustrates details of the floating decanter structure and the sludge blanket layer detector apparatus.
Figure 3:
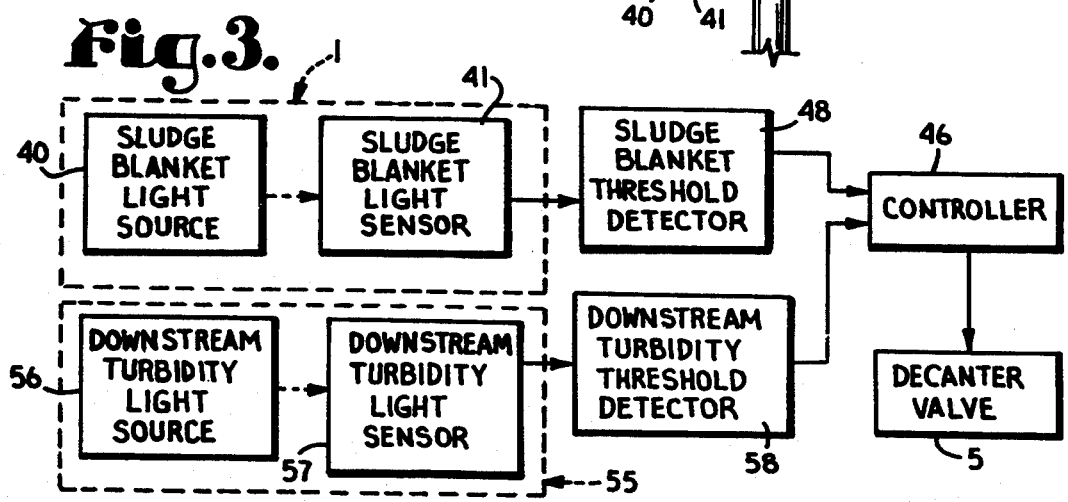
FIG. 3 is a simplified block diagram illustrating the sludge blanket layer detector apparatus along with a downstream turbidity detector connected through a process controller to a decanter valve of the process.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a sludge blanket layer detector apparatus which embodies the present invention. The apparatus is suspended from a floating decanter assembly 2 of a wastewater treatment process reactor 3 and is used to detect a sludge blanket layer 4 within the reactor 3 during a decant cycle of the process to control a decanter valve 5 which opens to withdraw clarified fluid from the reactor during the decant cycle.

The illustrated reactor 3 is a sequencing batch reactor in which batches of wastewater 7, such as biologically or chemically contaminated water, are treated in such a manner as to convert the contaminants into non oxygen demanding materials and gasses leaving the sludge blanket layer 4 which contains a mostly active bacterial biomass and, clarified water 9 above the sludge blanket layer 4. The clarified water 9 is periodically removed or decanted by way of the decanter assembly 2. The treatment process includes a fill cycle in which the reactor 3 is filled with the wastewater 7 to be treated, a mix cycle in which bacteria rich sludge (not shown) is mixed along with oxygen with the wastewater for reaction with biological and chemical contaminants therein, a settle cycle in which the sludge (biomass including live bacteria) is allowed to precipitate to the bottom of the reactor 3, and a decant cycle in which the clarified effluent or water 9 is decanted from the reactor 3. Periodically excess sludge may be wasted from the reactor 3.

The reactor includes a bottom wall or floor 11 with a side wall 12 extending thereabout to close the sides thereof. The reactor 3 may be circular or rectangular as viewed from above. The wastewater 7 to be treated is pumped into the reactor 3 by a fill pump 15 through a fill valve 16 to a fill conduit 17 which connects with a distribution manifold 18 having a plurality of apertures 19 spaced therealong and extending across and near the floor 11 of the reactor 3. A mixer apparatus 22 is supported above the floor 11 and has a water supply conduit 23 and a compressed air conduit 24 connected thereto. Water propelled by compressed air is sprayed radially through radial mixer nozzles 25 of the mixer 22 to agitate the sludge with the wastewater 7 to promote reaction therewith while mixing oxygen with the reactants. The mix cycle may, overlap with the fill cycle.

During the settle cycle, the sludge settles toward the reactor floor 11 in a generally well defined layer 4 which, over time, deposits in a blanket onto the floor 11 of the reactor 3. Normally, the decant cycle is begun before complete deposition of the sludge has occurred. The effluent 9 is decanted by opening the decanter valve 5, allowing the clarified fluid 9 to enter the decanter assembly 2 and discharge through the decanter conduit 28. The decanter assembly 2 includes an elongated decanter manifold or receiver 30 which has a plurality of entrance apertures 31 passing from the exterior to the interior on a lower side thereof. The apertures 31 preferably have valve members (not shown) therein, such as disclosed in U.S. Pat. No. 5,036,882, which remain closed during the fill, mix, and settle cycles to avoid the entry of suspended sludge into the decanter assembly 2 but which are opened by differential pressure when the decanter valve 5 is opened.

The decanter manifold 30 is buoyantly supported by an elongate float member 32. The illustrated float member 32 is oriented parallel to the manifold 30 and is connected thereto by means such as double ended collar connectors 33 which are rotatably connected to the manifold 30 and fixedly connected to the float 32. The manifold 30 is flow connected by a decanter collector conduit 34 and a flexible elbow conduit 35 to the decanter conduit 28. The decanter valve 5 is positioned in the conduit 28 and controls flow therethrough. As the uppermost level of the clarified water 9 descends, the floating decanter assembly 2 pivots downwardly about the flexible elbow conduit 35, and the rotatable relationship of the connectors 33 with the decanter manifold 30 allows its vertical relationship with the float 32 to be maintained. The decanter assembly 2 may include a mechanical elbow joint 36 to strengthen the flexible elbow conduit 35 and to resist flexure of the elbow conduit 35 about a vertical axis.

The sludge blanket layer detector apparatus 1 includes a sludge blanket light source 40 and a sludge blanket light sensor 41 mounted in spaced apart relation on a sludge blanket detector frame 42. The apparatus 1 is suspended below the decanter manifold 30, by suspension means such as the illustrated cable 43 connected between the frame 42 and one of the connectors 33. Alternatively, the detector apparatus 1 could be mounted using a rigid member. The apparatus 1 is preferably positioned on the order of two feet below the decanter manifold 30 but this spacing can be varied should reactor conditions dictate, that is waste water at each location is different and the spacing may need to be lengthened where the sludge blanket and clarified water interface 44 is poorly defined or shortened where the interface 44 is clearly defined.

The light source and sensor 40 and 41 may be designed to respectively emit and receive light in the visible spectrum or the infrared spectrum, depending, in addition to other factors, on the physical configuration of the housings in which the elements 40 and 41 are mounted and the susceptibility of such housings to ambient light leakage. Preferably, the mutually facing surfaces of the elements 40 and 41 are oriented vertically to avoid degradation of their performance due to the deposition of sludge on lenses (not shown) thereof. The use of the flexible cable 43 allows the apparatus 1 to be lifted periodically for cleaning such lenses. It is desirable for the light sensor 41 to be very sensitive to detect even small amounts of suspended sludge in the clarified fluid 9. However, such sensitivity may cause the sensor to be vulnerable to electrical noise and the like. Therefore, the light sensor 41 is preferably interfaced to the process controller 46 by a threshold detector 48, such as a Schmitt trigger circuit or the like, which outputs a change of logic state in response to the light sensed by the sensor 41 diminishing to a selected level.

The controller 46 is preferably a programmable computer and may be the overall controller for the entire wastewater treatment process occurring in the reactor 3. The controller 46 may, alternatively, be a slave processor which only controls the decant cycle and which communicates with such an overall process controller. The controller 46 is interfaced to the decanter valve 5 through appropriate drivers (not shown) which may include amplifiers, relays, and a solenoid actuator (not shown). The decanter valve is opened and closed on command from the controller 46.

As the decant cycle progresses and the clarified effluent 9 drains through the decanter manifold 30, the surface level 60 of the fluid in the reactor 3 drops, causing the floating decanter assembly 2 to descend and the collector conduit 34 pivots downwardly, as indicated by the arrow 50 in FIG. 1. The detector apparatus 1 eventually enters the sludge blanket layer 4 by passing through the interface 44. The light from the light source 40 to the light sensor 41 is obscured by the dark and generally opaque material in the suspended sludge in the layer 4 which is located between the light source and sensor 40 and 41, causing the threshold detector 48 to output a change of logic state to the controller 46. In response, the controller 46 causes the decanter valve 5 to close, thereby ending the decant cycle. The wastewater treatment process is made more efficient by the use of the sludge blanket layer detector apparatus 1 since the maximum clarified fluid 9 is decanted without risking the discharge of polluting sludge by use of the apparatus 1.

In order to provide further assurance that suspended sludge is not discharged during the decant cycle, the reactor 3 is provided with a downstream turbidity sensor 55, which is positioned in the decant conduit 28. The turbidity sensor 55 includes a turbidity light source 56 and a turbidity light sensor 57 positioned in spaced apart relation within the decanter conduit 28. The presence of suspended sludge in the effluent 9 diminishes the light from the light source 56 to the light sensor 57. The turbidity light sensor 57 is interfaced to the controller 46 through a turbidity threshold detector 58 which outputs a selected change of logic state upon the light sensed by the sensor 57 diminishing to a selected level.

In response to such a change of logic state from the threshold detector 58, the controller 46 causes the decanter valve 5 to close to end the decant cycle. Such a shutdown of the decant cycle is preferably followed by a settling period, after which the controller 46 polls the sludge blanket threshold detector 48 to determine if suspended sludge is detected by the sludge blanket light sensor 41. If not, the decant cycle is resumed, subject to further interruption by the downstream turbidity sensor 55 if suspended sludge is thereafter detected in the effluent 9 flowing through the decant conduit 28.

The apparatus 1 may be used in cooperation with a fixed position clarified liquid-sludge blanket interface sensor 65 mounted, as on the reactor side wall 12, by a fixed sensor bracket 66. The fixed sensor 65 may be configured similar to the floating interface sensor apparatus 1 and interfaced to the process controller 46 by a threshold detector (not shown). The fixed sensor 65 senses the interface 44 by detecting the increase or maximization of light transmission between elements of the sensor 65 as the sludge layer 4 settles below the sensor 65, whereby the clarified effluent 9 begins to surround the sensor 65. When this happens, the sensor 65 causes a logic stage change which is communicated to the controller 46. The logic state change may be employed by the controller 46 to initiate the decant cycle which is thereafter terminated by detection of the interface 44 by the floating interface detector 1.

It is foreseen that other types of sludge sensors could be utilized in accordance with the present invention. For example, the sensor could be an ultrasonic sensor that would identify the clarified liquid-sludge blanket interface by reflection of a portion of an ultrasonic pulse from the interface 44. The appropriateness of using such an ultrasonic technique would depend on the relative densities of the clarified layer 9 and the sludge blanket layer 4, the distinctness of the interface 44 therebetween, and other factors.

It is also foreseen that the sludge blanket-clarified liquid interface sensing apparatus of the present invention could be used with types of waste water treatment systems other than sequencing batch reactors where there is a sludge blanket formed and clarified water is removed from above the sludge blanket.

It is to be understood that while certain forms of the present invention have been illustrated and described herein, it is not to be limited to the specific forms or arrangement of parts described and shown.

What is claimed and desired to be secured by Letters Patent is as follows:

1. In a clarified liquid-liquid sludge blanket decanting and interface detector apparatus comprising floating decanter means for controlling the decanting of a clarified liquid from a waste water treatment vessel from above a sludge blanket, the improvement comprising:
   (a) interface detector means capable of detecting an interface between a clarified portion of a liquid and a layer of suspended sludge within said liquid; and
   (b) suspension means adapted to connect said detector means in depending relation from said floating decanter means.

2. An apparatus as set forth in claim 1 wherein said apparatus is operable for use with decanter valve means flow connected to said decanter means and operable to flow control decanting through said decanter means, and said apparatus further including:
   controller means coupled with said detector means and adapted for coupling with said valve means;

said controller means being operable for causing said valve means to close to thereby shut off decanting through said decanter means upon said detector means coming into contact with and detecting said interface.

3. An apparatus as set forth in claim 2 and including:
(a) threshold means coupling said detector means to said controller means, said threshold means outputting a selected logic level upon said detector means detecting a selected concentration of sediment as said detector means passes through said interface.

4. An apparatus as set forth in claim 2 and including:
(a) fixed position interface sensor means adapted to be positioned in said vessel at a selected depth therein and coupled to said controller means; and
(b) said controller means being operative to open said decanter valve means to initiate decanting through said decanter means upon said fixed position interface sensor means detecting said interface.

5. A sludge blanket layer detector apparatus operable for detecting a layer of sludge in a wastewater treatment process utilizing floating decanter means connected to a decanter conduit having decanter valve means flow connected therein and operable to control decanting of liquid from a reactor container of said process through said decanter means, said apparatus comprising:
(a) a detector frame;
(b) a light source and a light sensor positioned in spaced apart relation on said detector frame whereby a portion of said liquid is located between said source and said sensor and suspended sludge within said portion of said liquid affects the transmission of light from said source to said sensor;
(c) suspension means adapted to connect said detector frame in depending relation to said floating decanter means; and
(d) controller means having said light sensor coupled thereto and adapted for coupling with said decanter valve means;
said controller means being operable for causing said valve means to close so as to shut off decanting through said decanter means in response to said light sensor detecting said layer.

6. An apparatus as set forth in claim 5 in combination with:
(a) turbidity sensor means adapted to be positioned in said decanter conduit and coupled to said controller means; and
(b) said controller means being operable for causing said valve means to close to thereby shut off decanting through said decanter means upon said turbidity sensor means sensing sludge liquid in within said conduit.

7. An apparatus as set forth in claim 6 wherein said turbidity sensor means includes:
(a) a turbidity light source; and
(b) a turbidity light sensor coupled to said controller means and positioned in spaced relation to said turbidity light source whereby said liquid flows between said turbidity light source and said turbidity light sensor and suspended sludge in said liquid affects the transmission of light from said turbidity light source to said turbidity light sensor.

8. An apparatus as set forth in claim 5 and including:
(a) threshold means coupling said light sensor to said controller means, said threshold means outputting a selected logic level upon said light sensor detecting a selected concentration of suspended sludge in said layer.

9. An apparatus as set forth in claim 5 and including:
(a) fixed position sludge blanket sensor means adapted to be positioned in said container at a selected depth therein and coupled to said controller means; and
(b) said controller means being operative to open said decanter valve means to initiate decanting through said decanter means upon said fixed position sludge blanket sensor means detecting an interface between said layer of sludge and said liquid to be decanted.

10. A suspended sludge detector apparatus operable for detecting sludge suspended in a clarified liquid of a wastewater treatment process utilizing floating decanter means connected to a decanter conduit having decanter valve means flow connected therein and operable to control decanting of liquid from a reactor container of said process through said decanter means, said apparatus comprising:
(a) a sludge blanket detector frame;
(b) a sludge detector light source and a sludge detector light sensor positioned in spaced apart relation on said detector frame whereby a portion of said liquid is located between said source and said sensor and suspended sludge within said portion of liquid affects the transmission of light from said source to said sensor;
(c) suspension means adapted to connect said detector frame in depending relation to said decanter means;
(d) turbidity sensor means adapted to be positioned in said decanter conduit and operative to detect sludge suspended in said liquid in said conduit; and
(e) controller means having said light sensor means and said turbidity sensor means coupled thereto, and adapted for coupling with said decanter valve means;
said controller means being operable for causing said valve means to close so as to shut off decanting through said decanter means in response to said sludge detector light sensor or said turbidity sensor means detecting said sludge in said liquid.

11. An apparatus as set forth in claim 10 wherein said turbidity sensor means includes:
(a) a turbidity light source; and
(b) a turbidity light sensor coupled to said controller means and positioned in spaced relation to said turbidity light source where, when said liquid flows between said turbidity light source and said turbidity light sensor, then suspended sludge in said liquid affects the transmission of light from said turbidity light source to said turbidity light sensor.

12. An apparatus as set forth in claim 10 and including:
(a) threshold means coupling said sludge detector light sensor and said turbidity sensor means to said controller means, said threshold means outputting a selected logic level upon said sludge detector light sensor or said turbidity sensor means detecting a selected concentration of suspended sludge in said liquid.

13. An apparatus as set forth in claim 10 and including:
a) fixed position suspended sludge sensor means adapted to be positioned in said container at a selected depth therein and coupled to said controller means; and (b) said controller means being operative to open said decanter valve means to initiate decanting through said decanter means upon said fixed position suspended sludge sensor means detecting an interface between a layer of said suspended sludge and said liquid to be decanted.

14. In a clarified liquid-sludge blanket interface detector apparatus adapted for a process utilizing floating decanter means for controlling the decanting of a clarified liquid from a waste water treatment vessel from above a sludge blanket, said process also utilizing decanter valve means flow connected to said decanter means and operable to flow control decanting through said decanter means, said decanter means being flow connected to a decanter conduit having said valve means flow connected therein, the improvement comprising:

(a) interface detector means;

(b) suspension means adapted to connect said detector means in depending relation from said floating decanter means;

(c) controller means having said detector means coupled thereto and adapted for coupling with said valve means;

said controller means being operable for causing said valve means to close to thereby shut off decanting through said decanter means upon said detector means coming into contact with and detecting said interface; and (d) turbidity sensor means adapted to be positioned in said decanter conduit and coupled to said controller means;

said controller means also being operable for causing said valve means to close so as to operably shut off decanting through said decanter means upon said turbidity sensor detecting suspended sediment in the water within said conduit.

15. In a clarified liquid-sludge blanket decanting and interface detector apparatus comprising floating decanter means for controlling the decanting of a clarified liquid from a waste water treatment vessel from above a sludge blanket, the improvement comprising:

(a) interface detector means including:
  (1) light source means; and
  (2) light sensor means positioned in spaced relation to said light source means such that portions of said liquid are located directly between said source means and said sensor means during use and whereby suspended sediment, including sediment in said sludge blanket, within said liquid affects the transmission of light from said source means to said sensor means; and (b) suspension means connecting said detector means in depending relation from said floating decanter means.

* * * * *